Dec. 30, 1969 W. R. SALVESEN 3,486,511
COIN ORIENTING ARRANGEMENT
Filed Nov. 16, 1967 7 Sheets-Sheet 1

INVENTOR.
WILLIAM R. SALVESEN
BY
ATTORNEYS

Dec. 30, 1969 W. R. SALVESEN 3,486,511
COIN ORIENTING ARRANGEMENT
Filed Nov. 16, 1967 7 Sheets-Sheet 2

FIG. 3

INVENTOR.
WILLIAM R. SALVESEN
BY
ATTORNEYS

Dec. 30, 1969 W. R. SALVESEN 3,486,511
COIN ORIENTING ARRANGEMENT
Filed Nov. 16, 1967 7 Sheets-Sheet 3

INVENTOR.
WILLIAM R. SALVESEN
BY
ATTORNEYS

Dec. 30, 1969  W. R. SALVESEN  3,486,511
COIN ORIENTING ARRANGEMENT
Filed Nov. 16, 1967  7 Sheets-Sheet 4

INVENTOR.
WILLIAM R. SALVESEN
BY
ATTORNEYS

Dec. 30, 1969 W. R. SALVESEN 3,486,511
COIN ORIENTING ARRANGEMENT
Filed Nov. 16, 1967 7 Sheets-Sheet 5

INVENTOR.
WILLIAM R. SALVESEN
BY
ATTORNEYS

United States Patent Office 3,486,511
Patented Dec. 30, 1969

3,486,511
COIN ORIENTING ARRANGEMENT
William R. Salvesen, Brooklyn, N.Y., assignor to Segal Products Co., Inc., Brooklyn, N.Y., a corporation of New York
Filed Nov. 16, 1967, Ser. No. 683,698
Int. Cl. G07d 9/00; B23q 7/08; B65h 9/00
U.S. Cl. 133—1                                  34 Claims

ABSTRACT OF THE DISCLOSURE

A coin orienting arrangement to cascade coins onto a ramp where the coins attain desired edgewise orientation as they roll toward longitudinal slots and fall into such slots with great rapidity. Preferably, the coins are somewhat guided toward such slots. In the slots, the coins are held in alignment and may be delivered to coin wrapping machines for rapid packaging of coin packs of standard denomination.

---

The present invention relates to an improved coin orienting arrangement.

The great use of coins today has caused a great need for the fast and inexpensive handling of coins. Large amounts of coins, such as received from the machine vending industries are bulky and unwieldy unless they can be packaged into packs of fixed denominations.

Handling coins can be expensive, not only in labor, but the time taken to prepare coins for reuse may keep large sums of money out of circulation.

Packaging of coins has been limited by machinery that can only feed a limited amount of coins to a wrapping machine. In feeding coins for wrapping, they must not only be delivered in the proper numbers, but also must be aligned so that they can be wrapped. Typical coin packages are a two dollar pack of forty nickels, a five dollar pack of fifty dimes, a ten dollar pack of forty quarters or a fifty cent pack of fifty pennies.

Problems in feeding coins are weight, orientation and keeping coins from jamming in being fed. This problem becomes acute as the wrapping speed becomes faster. Many machines today wrap up to 30 rolls per minute. If you were to wrap 60 rolls of pennies (50 pennies per roll) per minute, you have to feed 3,000 coins per minute or 180,000 coins per hour. One can imagine the weight and volume problem.

In the past, slow, complicated or jammable methods have been used to prepare coins for wrapping, delivering the coins in desired number and orientation to the wrapping machines.

Various devices have been provided to change coin orientation from amorphous piles of coins to vertical or horizontal packs or stacks which may then be wrapped.

One of the more usual forms has been to roll coins down narrowing V shaped chutes which would converge at a point, delivering a line of 40 or 50 aligned coins, each standing on its narrow edge, ready to be packed.

The problems with such devices of the past included limitation upon speed of delivery of coins and delivery malfunction in the chutes.

The chutes, because of weight, or jamming difficulties, were limited in the speed within which, and the number of coins that could be delivered for wrapping. The V channels often jammed as more than one coin reached the narrow neck of the V chute, closing that entire chute to the passage of other coins, resulting in a miscount in wrapping or just plain coin jamming and malfunction.

Other mechanical configurations have been employed wherein coins have been induced to align themselves by being passed through narrower openings and led to chutes or by individual handling, or by aligning devices.

Such methods of the past, whether satisfactory or not, have been limited in speed because of the weight of coins to be handled and the time taken to align coins even when jamming has not been a problem.

According to the present invention, a means is provided for delivering an almost unlimited number of coins aligned and in fixed number units to a wrapping machine to be wrapped as fast as the wrapping machine can wrap in packages of usual denominations. The present invention avoids the time and jamming problems encountered by feeding means of the past.

Instead of turning coins in a chute or on an individual basis, coins used with the present invention align themselves on their edges and fall into slots for rapid delivery to a wrapping machine from the slots. The coins are held edgewise in single file within the slots.

Although such novel feature or features believed to be characteristic of the invention are pointed out in the claims, the invention and the manner in which it may be carried out may be further understood by reference to the description following and the accompanying drawings.

Referring now to the figures in greater detail, where like reference numbers denote like parts in the various figures.

Figures 1, 2:
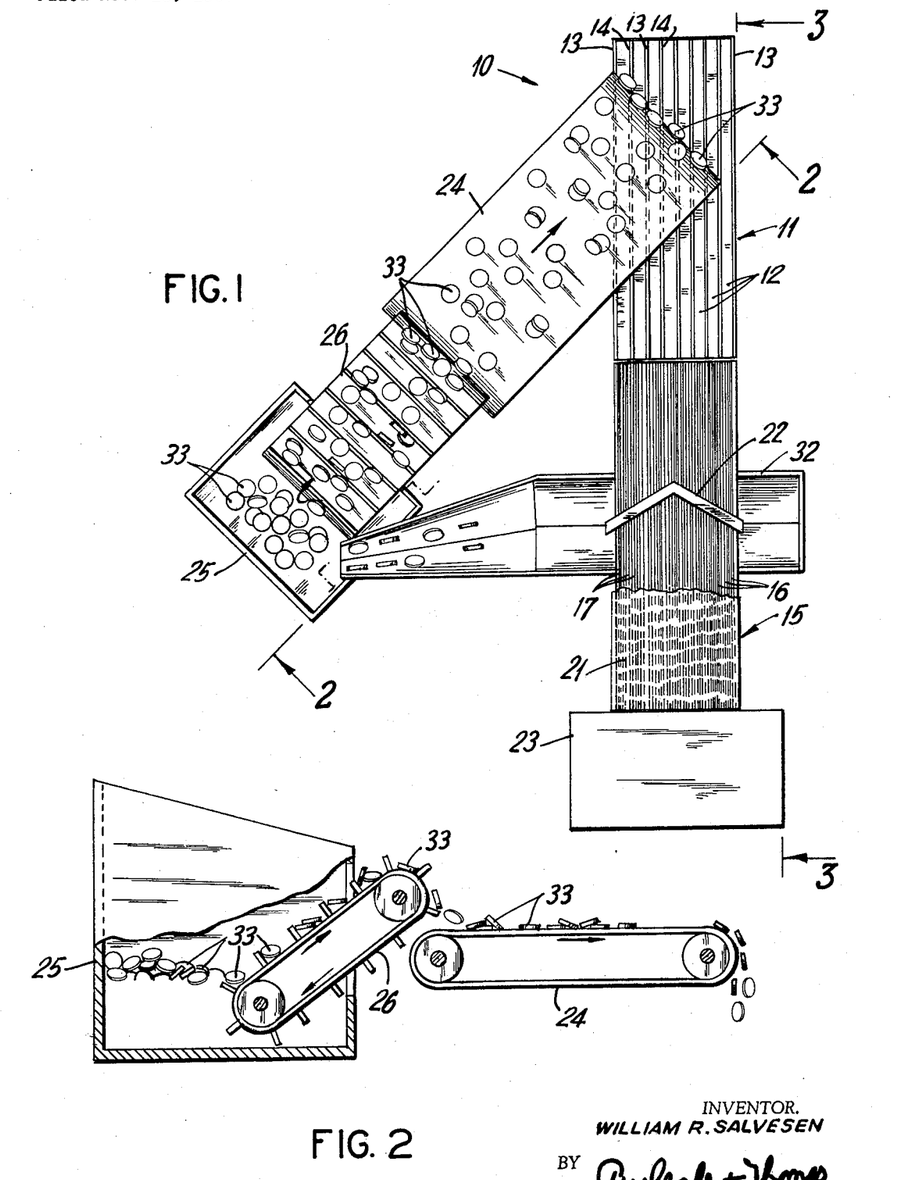
FIG. 1 is a plan view of the coin feeder of the present invention with a coin carrying means.
FIG. 2 is a section of FIG. 1 at lines 2—2.
Figure 3:
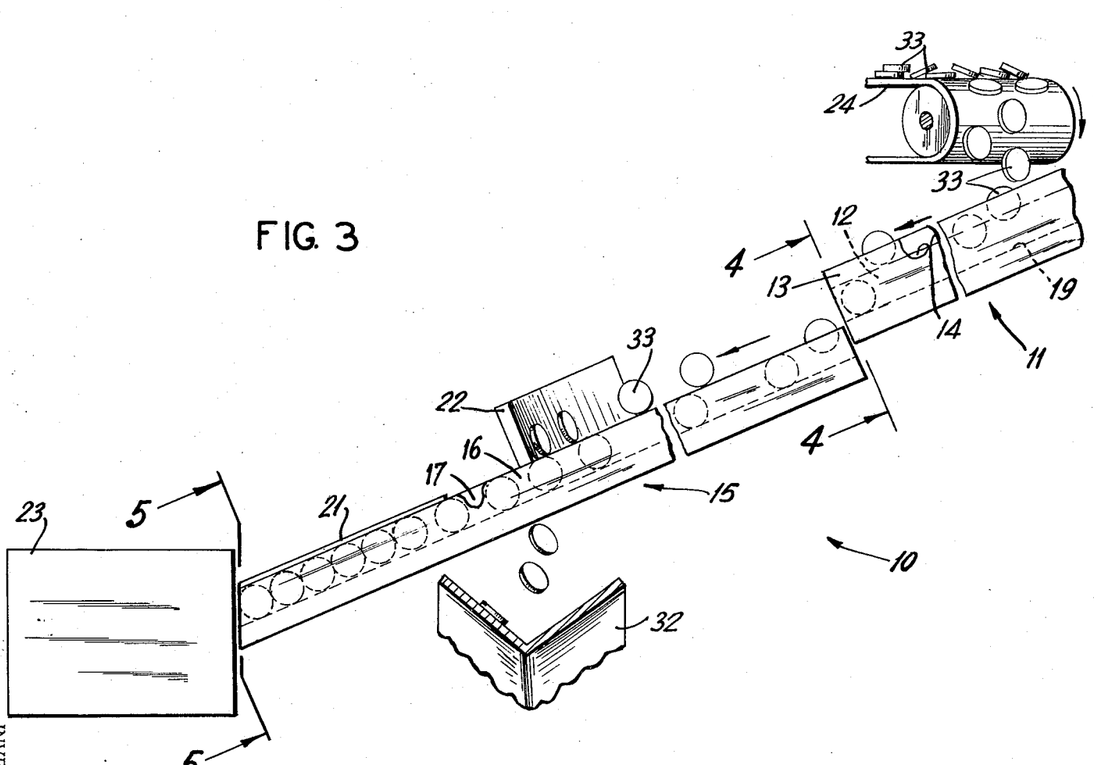
FIG. 3 is a section of FIG. 1 at lines 3—3.
Figure 8:
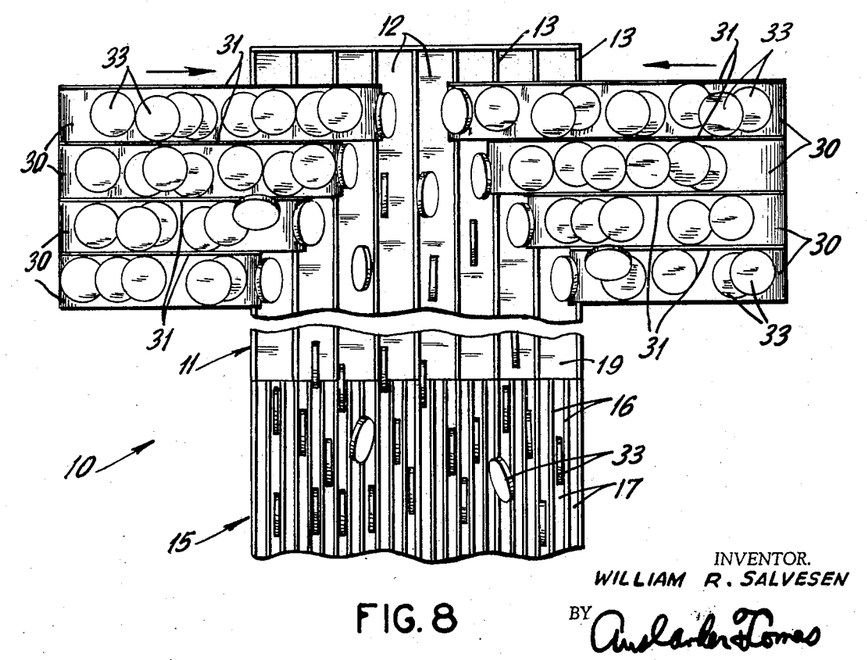
FIG. 8 is an alternate means for coin conveying according to the present invention.

The coin feeder 10 as shown in FIGS. 1, 3 and 8 is a ramp comprising two sections. The first section 11 is a series of channels 12 which are spaced apart, preferably a width less than the diameter of the denomination of coins to be fed and more than the width of two coins.

Figure 4:
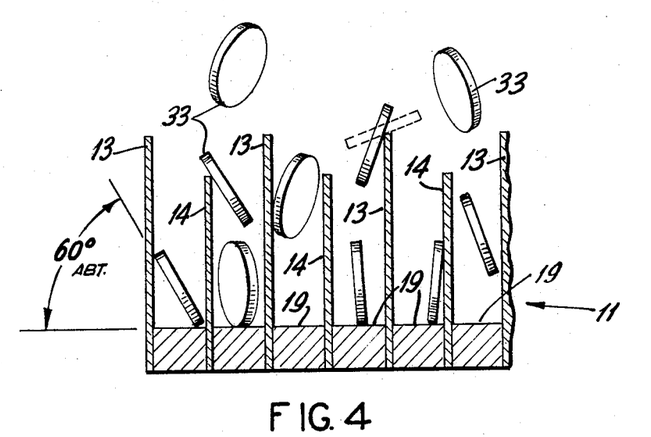
FIG. 4 is a section of FIG. 3 at lines 4—4.
Figure 5:
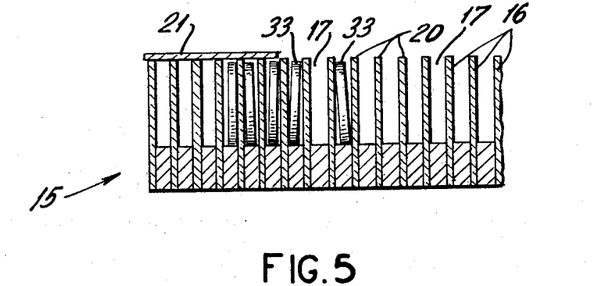
FIG. 5 is a section of FIG. 3 at lines 5—5.

As shown in FIG. 4, a preferred width allows a coin to form an angle of about 60° if it lies between the walls 13, 14 of the channels 12.

The second section 15 is made of a series of spaced apart walls 16 spaced to just a small tolerance over the normal width of the particular denomination coin selected to be fed for wrapping. The particular spacing is such that each coin slot 17 is wide enough to accommodate a normal coin and its usual variations in thickness with an allowance for some abnormality for dents and bends. The tolerance of the slot 17 is small enough to avoid the jamming in the slot 17 of more than one coin.

The coin feeder 10 may be unitary as shown in FIG. 8, or the sections 11, 15 may be spaced apart by a small gap 18 shown in FIG. 3.

As shown in FIG. 3 the bottom level 19 of the first section 11, upon which the coins may roll, meets the top level 20 of the walls 16 of the second section 15, on a plane, although the top level 20 may be below the bottom level 19.

The second section 15 is provided with a cover 21 which adjoins a bumper 22. The bumper 22 crosses the top level of the second section 11.

The portion of the second section 15 of the feeder 10 between the bumper 22 and the first section 11 is open, exposing the selected number of coin slots 17 for the particular denomination of coins to be wrapped.

Figure 10:
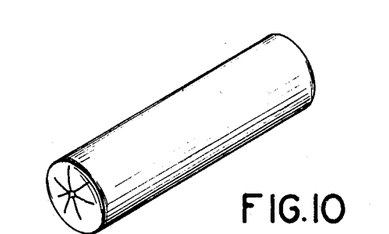
FIG. 10 is a perspective view of a coin roll.
Figure 11:
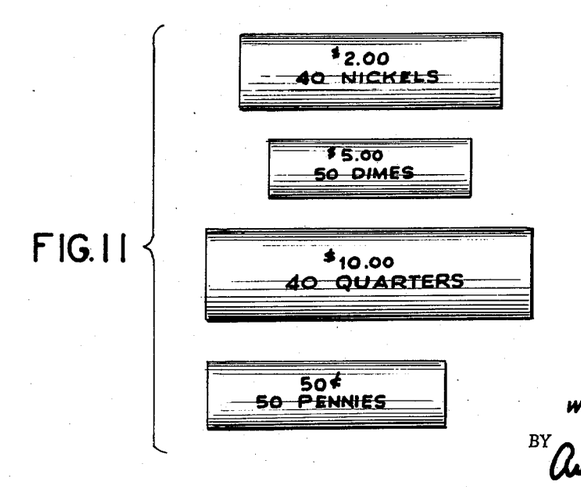
FIG. 11 is a side elevation of a plurality of commonly employed coin rolls.

The feeder 10 may be a removable unit in the form of a ramp so that where desired, ramp feeders 10 may be interchangeably employed with coin delivery equipment so as to place in the coin feed flow a ramp feeder having 40 slots 17 for nickels, or 40 slots 17 for quarters, or 50 slots 17 for dimes or 50 slots 17 for pennies, to deliver coins to the wrapping unit 23 to provide standard coin packages such as shown in FIGS. 10 and 11.

The coins are fed to the feeder 10 by various means delivering them to the first section 11 and dropping them so that the coin tends to drop edge first.

As shown in FIGS. 1, 3 coins are dropped onto a conveyer belt 24 from a bin or hopper 25 by means of a finned belt 26.

The finned belt 26 is able to move a great volume of coins and drop them onto the conveyer belt 24 as it moves, straddling the coin feeder 10.

Figure 6:
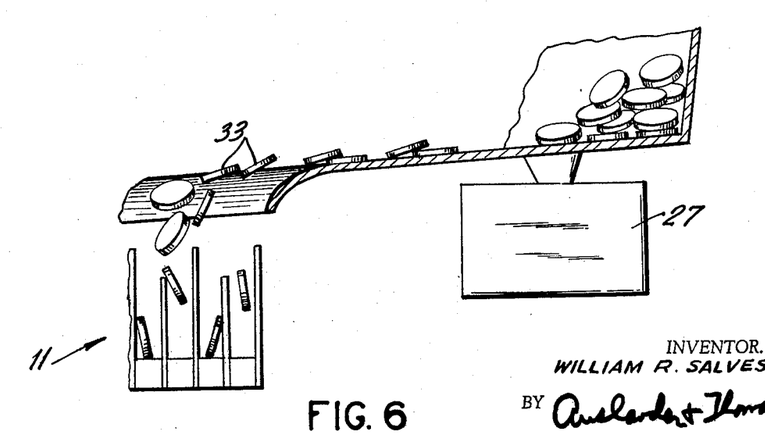
FIG. 6 is an alternate means for coin conveying according to the present invention.
Figure 7:
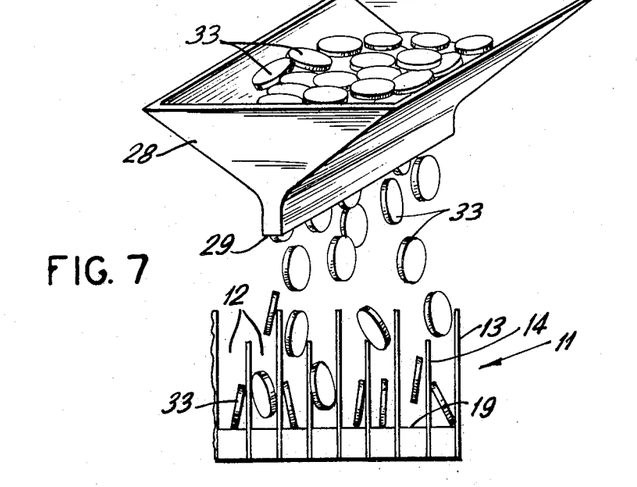
FIG. 7 is an alternate means for coin conveying according to the present invention.

As shown in FIG. 6, coins are moved to the coin feeder 10 by an alternate method such as a vibrator feeder 27. Coins may be dropped onto the first section 11 from a hopper 28, preferably having a narrow or tapered opening 29.

Figure 9:
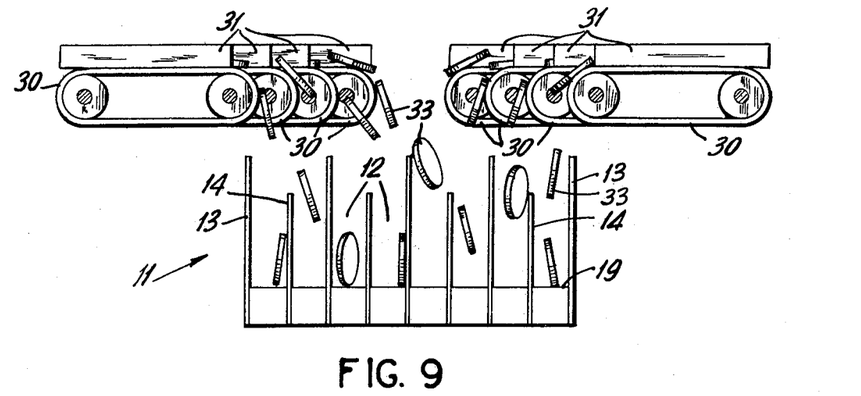
FIG. 9 is a partial front elevation of FIG. 8.

As shown in FIGS. 8 and 9, a series of conversion belts 30 with fins 31 override the first section 11 of the coin feeder 10. Coins are then more evenly distributed to the channels 12.

As shown in FIGS. 1 and 3, a return 32 is in position to catch any overflow coins and return them to the hopper 25 for redistribution.

Figure 12:
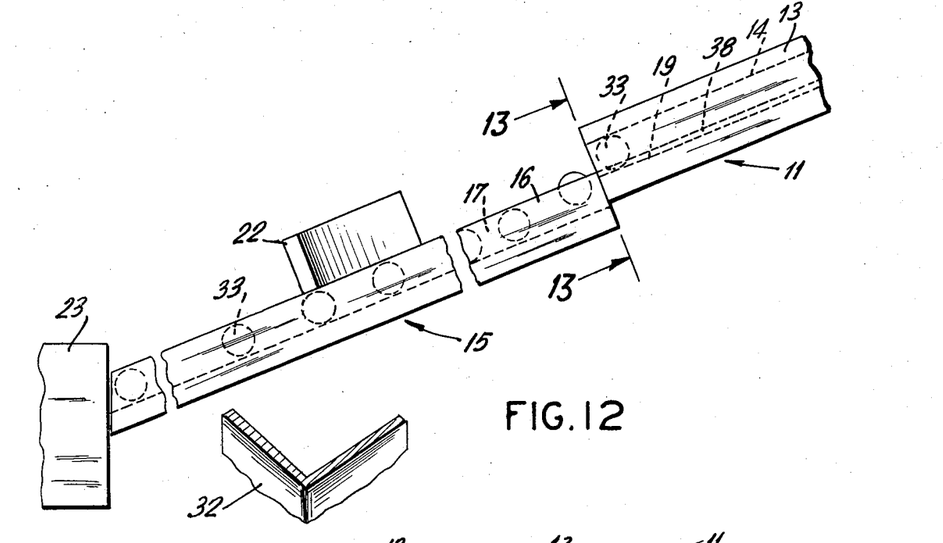
FIG. 12 is a sectional view of another embodiment of the present invention.
Figures 13, 14:
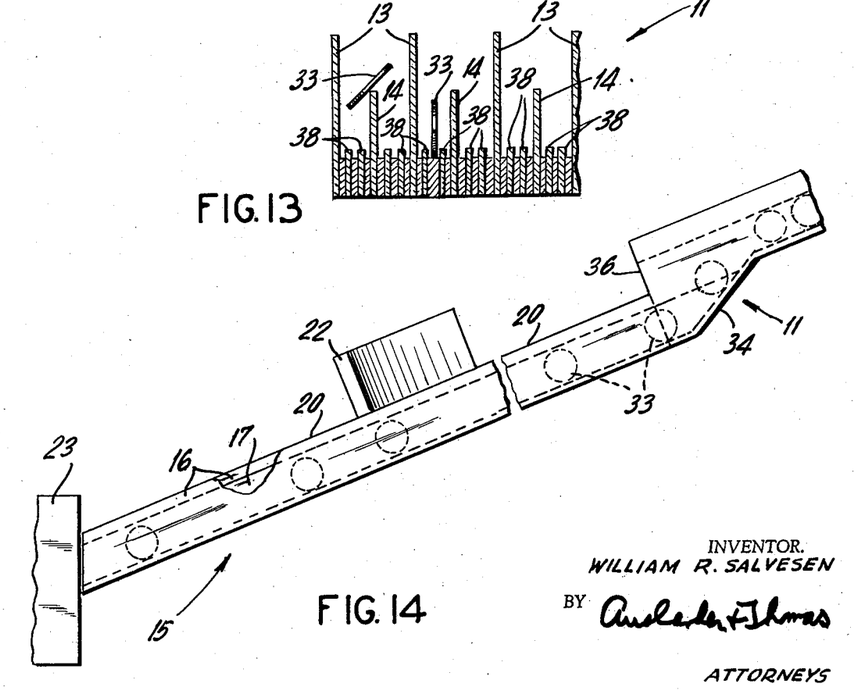
FIG. 13 is a sectional view taken along lines 13—13 of FIG. 12.
FIG. 14 is a sectional view of another embodiment of the present invention.

As shown in FIGS. 12 and 13, the first section 11 may include in addition to walls 13 and 14 longitudinal ribs 38 further transversely subdividing the first section 11 with the ribs 38 providing further guide channels therebetween for coins 33.

By having the plurality of guide channels on the first section 11 which are defined by the ribs 38 and walls 13, 14 equal in transverse size and number to the coin slots 17, the coins 33 will align themselves for ready delivery into the second section 15. As shown in FIG. 12, where the walls 16 of the second section 12 extend above the bottom level 19 of the first section 11, the ribs 38 and walls 13, 14 of the first section 11 abut and may even be extensions of the upper portion of walls 16.

In lieu of the vertical drop-off of the coins from the first section 11 to the second section 15, such as shown in FIGS. 3 and 12, the first section 11 may include a sloped portion 34 beginning at a point on the first section 11 spaced apart from the second section 15, with the base of the first section 11 inclining so as to be on the same plane with the base of the second section 15 at their point of juxtaposition whereby edgewise rolling coins 33 on the coin feeder 10 will be fed on the second section 15. The sloped portion 34 is transversely subdivided into slots which are in contiguous longitudinal alignment with the slots 17 of the second section 15 and may be extensions thereof. In such manner coins 33 which are not properly aligned so as to fit into slots 17 will not ride down the sloped portion 34, but will ride outward of the first section 11 and will either fall into the slots 17 as they exit the downward end portion of the first section 11 or be directed off the top portion of the second section 15 by the bumper 22 for recirculation.

Figures 15, 16:
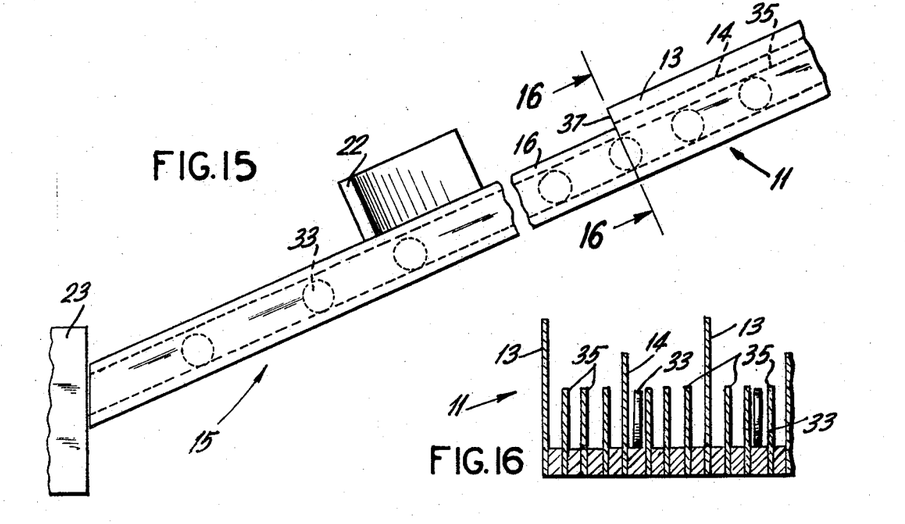
FIG. 15 is a sectional view of another embodiment of the present invention.
FIG. 16 is a sectional view taken along lines 16—16 of FIG. 15.

As shown in FIGS. 15 and 16, the first section 11 may be transversely subdivided to provide channels spaced apart to just a small tolerance over the normal width of the particular denomination coin 33 selected to be fed for wrapping. As shown in FIG. 16, the channels are formed by the walls 13, 14, hereinbefore described and by the interposition therebetween of partitions 35 of a height which is less than that of walls 13, 14 and which preferably are equal to the height of slot walls 16 of the second section 15. The second section 15 and the first section 11 are in juxtaposition with their respective bases on substantially the same plane, with the walls 16 of the second section 15 and the walls 13, 14 and partitions 35 of the first section 11 in axial alignment.

Figures 17, 18:
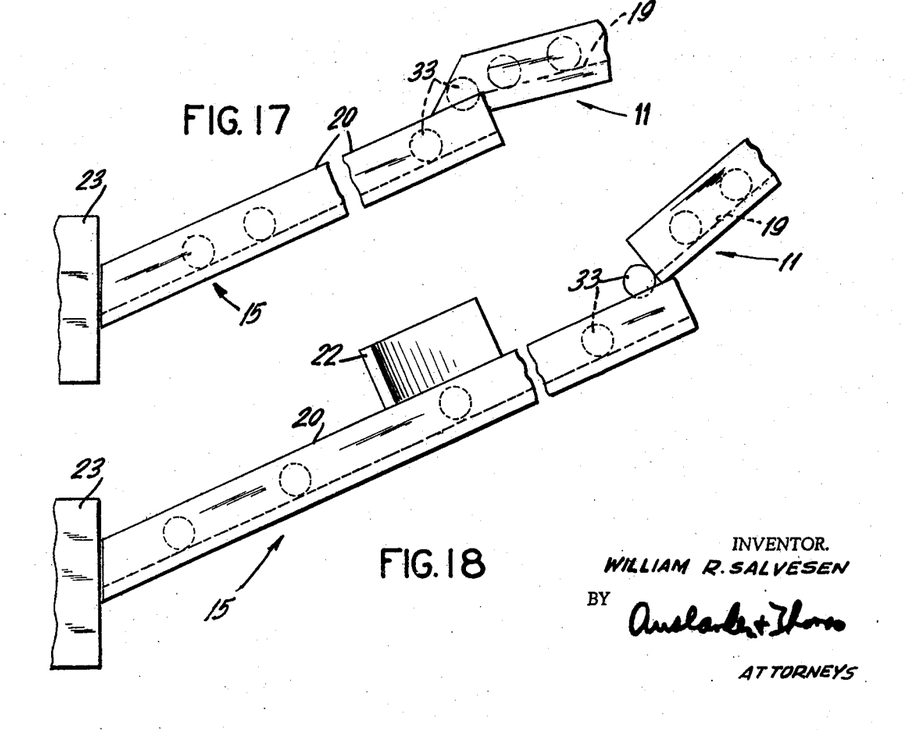
FIG. 17 is a sectional view of another embodiment of the present invention.
FIG. 18 is a sectional view of another embodiment of the present invention.

While the downsloping arrangement of the first and second sections 11, 15 have been shown on a plane, it is within the scope of the present invention to have differing angles of slope for the first and second sections 11, 15 such as illustrated in FIGS. 17 and 18.

The walls 13, 14 and channels 12 are exemplary. Coins cascaded onto the first section 11, falling toward the ramplike first section 11 tend to roll on their edges. Sufficient numbers reach the slots 17 of the second section 15 to fill them even without any form of guide means.

The guide means may be in the form of baffles or fingers (not shown) or may comprise the ribs 38 of FIG. 12 or the partitions 35 of FIG. 16 in order to achieve better orientation of the rolling coins. Those coins that do not roll, slide, as in the case of the coins which do not get caught in the slots 17, these coins are diverted by the bumper 22 which also acts as a barrier and the coins are dropped off the second section 15 from whence they may be recirculated.

The first and second sections 11, 15 whether unitary, juxtaposed or having a gap 18 therebetween, must provide a substantially unobstructed flow path at the area where the coins 33 reach the second section 15.

In FIGS. 1, 3, 8, 12, 17 and 18, the bottom level 19 of the first section 11 is vertically aligned close to the top level 20 of the second section 15. While the top level 20 of the second section 15 may be slightly above the bottom level 19 of the first section 11 without impeding coin flow seriously, as the top level 20 is raised, there comes a point where coins may hit the ends of the walls 16 and block the openings to the slots 17. The bottom level 19 of the first section 11 may be oriented above the top level 20 of the second section 15 since the rolling coins 33 may drop without much, if any change in orientation, and still engage in the slots 17. Too great a drop may reduce efficiency by promoting bouncing of the coins.

In FIG. 14 an unobstructed flow path is provided by having a portion of the end portion 36 of the first section 11 oriented above the top level 20 of the second section 15 providing an exit for coins 33 which due to their direction of movement or vertical position do not ride down the sloped portion 34. Such coins 33 whether rolling or sliding downward in an undesired manner will be diverted by the bumper 22 and dropped off the second 15 and recirculated.

As shown in FIGS. 15 and 16; the open end portion 37 of the first section 11 allows coins which have not dropped down between partitions 35, but rather are rolling or sliding along the top edge of such partition to exit above the slots 17 and be dropped off and recirculated.

When the coins are delivered to the coin feeder 10 as shown in FIGS. 1 to 3 the coins are indiscriminately dropped upon the conveyer belt 24 where they settle askew, lying on one face or another. The conveyer belt 24 spans or straddles the width of the first section 11 so that coins are dropped off into all the channels 12.

As can be seen in FIGS. 2 and 3, the coins coming off the conveyer belt 24 drop off the rounded end of the conveyer belt 24 so that as the coins begin to fall, they tend to fall edgewise.

It is preferable to provide an edgewise orientation to the coins as they hit the first section 11 of the feeder 10 since the coins may cascade faster if already oriented. The vibrator feeder 27, hopper 28 and belts 31 all impart an edgewise drop to the coins.

As shown in FIGS. 1, 3, 4, 6, 7, 13 and 16 the walls 13, 14 forming the channels 12 are of different heights. Those coins falling into the channels 12 which are not edgewise oriented are most likely to hit the top of the walls 13, 14 tending to edgewise orient them and tending to turn the coins to edgewise orientation longitudinally along the longitudinal axis of the channels 12. The lower walls 14 tend to provide the proper orientation with less chance of a coin bouncing out of the channel 12 toward which it is dropped. The walls 13 as shown in FIGS. 8 and 9 may be of uniform height.

The coin feeder 10 is downsloping or generally angulated downward so that coins once in the channels 12, tend naturally to roll. These coins, properly edgewise oriented, are guided by the walls to roll along the longitudinal axis of the first section on their edges. Coins which have not started to roll on their edges as shown in FIG. 4 cannot fall over and block the channel 12.

Coins starting to roll, but not on their edges, tend to right themselves as they gather, rolling momentum and right themselves on their edges as a unicycle wheel or hoop remains erect once it has gained speed.

The coins from the first section cascade out of the channels 12, generally oriented along the longitudinal axis of the coin feeder 10. As these coins cascade out of the channels 12 they either are in proper position to be caught in the slots 17 or immediately ride over the top level 20, where further coins may fall into some slot 17.

The cascade of coins supplies enough coins to fill all the slots 17. Those coins that do not fall into the slots 17, roll or slide over the top level 20 of the coin feeder 10 or along the bumper 22 and are caught by the return 32 to be reconveyed to the coin feeder 10.

The end of the second section 15 adjacent the wrapping unit 23 receives aligned coins in selected number which may be wrapped as fast as the wrapping machine can handle them. The coins in the slots 17 are in a single file line in each slot 17, slanting vertically, resting on their edges.

Within the purview of the invention would lie improvements not disclosed herein to impel the feeding of the coins once they are in the feeder 10, in the event the gravity feed speeds were too slow to meet the packing speed of the wrapping unit 23.

In FIG. 8 the fins 31 between the conveyers tend to divide the coin pile on the conveyer belts 30, giving a more even delivery of coins to the channels 12.

The terms and expressions which are employed are used as terms of description; it is recognized, though, that various modifications are possible.

Having thus described certain forms of the invention in some detail what is claimed is:

1. A coin orienting arrangement comprising an inclined substantially flat first section, a second section, at least said first section downsloping towards said second section, said first section at the upper portion of said downslope, said second section including a selected number of longitudinal slots, each said slot adapted to receive a plurality of edgewise oriented coins in single file, coin holding means, means to transport said coins from said coin holding means to coin delivery means, said delivery means adapted to deliver a plurality of coins somewhat substantially edgewise oriented onto said first section to travel down said first section towards said second section, wherein random numbers of said coins assume edgewise alignment to said slots as they travel towards said second section, and means to return coins falling from said first and second sections to said coin holding means.

2. The invention of claim 1 wherein said coin delivery means comprises a conveyer belt having a free end portion overlying a portion of said first section, said conveyer belt adapted to drop random numbers of said coins onto said first section from said free end section.

3. The invention of claim 2 wherein said conveyer belt substantially spans the width of said first section.

4. The invention of claim 3 wherein said conveyer belt substantially spans said first section at an angle.

5. The invention of claim 1 wherein said coin delivery means comprises a plurality of conveyer belts, each said conveyer belt having a free end portion overlying a selected portion of said first section, and each said conveyer belt adapted to drop random numbers of said coins onto said first section from said free end section.

6. The invention of claim 5 wherein said conveyer belts have at least one fin between at least two of said belts.

7. The invention of claim 5 wherein said conveyer belts are disposed from both sides of said first section.

8. The invention of claim 1 wherein said coin delivery means comprises a vibratory feeder having at least one free end overlying a selected portion of said first section, said feeder adapted to vertically drop said coins somewhat edgewise onto said first section.

9. The invention of claim 1 wherein said coin delivery means comprises a hopper.

10. The invention of claim 9 wherein said hopper has a tapered opening at its bottom adapted to substantially edgewise orient said coins.

11. The invention of claim 1 wherein said first and second sections are constructed as a single unit.

12. The invention of claim 1 wherein there is a small gap between said first and second sections.

13. The invention of claim 1 wherein the top level of said second section extends no more than a slight distance above the bottom level of said first section.

14. The invention of claim 1 wherein the plane of the bottom level of said first section is in substantial conformity with the plane of the top level of said second section.

15. The invention of claim 1 wherein said first section includes means adapted to align said coins rolling along its slope to roll substantially along the longitudinal axis of said first section.

16. The invention of claim 1 wherein said first section includes a plurality of spaced apart longitudinal walls.

17. The invention of claim 16 further including at least one longitudinal rib between said longitudinal walls.

18. The invention of claim 16 including at least one slot on said first section contiguously aligned with at least one slot of said second section.

19. The invention of claim 18 wherein at least one contiguous slot in said first section joins said contiguous slot in said second section by a contiguous downsloping.

20. The invention of claim 16 wherein said longitudinal walls are spaced apart a distance less than the diameter of said coin of selected denomination.

21. The invention of claim 20 wherein said spacing is such that said coin of selected denomination cannot form an angle of less than 60° from the horizontal between said longitudinal walls.

22. The invention of claim 16 wherein said longitudinal walls are of different heights.

23. The invention of claim 16 wherein said longitudinal walls are alternately of two different heights.

24. The invention of claim 16 wherein said longitudinal walls are parallel.

25. The invention of claim 1 wherein said first section is at least as wide as said second section.

26. The invention of claim 1 wherein said longitudinal slots of said second section are a normal tolerance wider than the width of said coin of selected denomination.

27. The invention of claim 1 wherein said longitudinal slots of said second section are parallel and of uniform width.

28. The invention of claim 1 wherein a portion of said longitudinal slots on said second section are covered, said covered portion extending along the length of said slots on the downslope end of said second section.

29. The invention of claim 28 wherein said slots are adapted to deliver said coins to a wrapping unit and said cover extends to said delivery point.

30. The invention of claim 1 wherein said second section includes a means across its width and intermediate of its length adapted to divert the path of said coins which have not become engaged in said longitudinal slots.

31. The invention of claim 30 wherein such diverting means is a barrier defining a guide path for said coins toward at least one edge of said second section.

32. The invention of claim 30 having the longitudinal slots covered from said diverting means on the downslope end of said second section.

33. The invention of claim 1 wherein said first section is sloped at a steeper angle than said second section.

34. The invention of claim 1 wherein said second section is sloped at a steeper angle than said first section.

References Cited

UNITED STATES PATENTS

| 1,647,356 | 11/1927 | Hendry | 53—159 |
|---|---|---|---|
| 2,829,476 | 4/1958 | Engleson et al. | 53—159 |
| 2,639,445 | 5/1953 | Fray | 221—159 |
| 3,125,102 | 3/1964 | Bower | 133—3 |
| 3,340,882 | 8/1967 | Holmes et al. | 133—1 |

STANLEY H. TOLLBERG, Primary Examiner

U.S. Cl. X.R.

221—159